United States Patent
Shimizu et al.

(10) Patent No.: US 11,766,891 B2
(45) Date of Patent: Sep. 26, 2023

(54) PNEUMATIC TIRE

(71) Applicant: The Yokohama Rubber Co., LTD., Tokyo (JP)

(72) Inventors: Katsunori Shimizu, Hiratsuka (JP); Tsuyoshi Nomaguchi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 549 days.

(21) Appl. No.: 16/310,806

(22) PCT Filed: Jun. 27, 2017

(86) PCT No.: PCT/JP2017/023479
§ 371 (c)(1),
(2) Date: Dec. 17, 2018

(87) PCT Pub. No.: WO2018/003764
PCT Pub. Date: Jan. 4, 2018

(65) Prior Publication Data
US 2020/0316993 A1    Oct. 8, 2020

(30) Foreign Application Priority Data
Jul. 1, 2016  (JP) ................................ 2016-131797

(51) Int. Cl.
*B60C 1/00*  (2006.01)
*B60C 5/14*  (2006.01)
*C08L 15/02*  (2006.01)

(52) U.S. Cl.
CPC .............. *B60C 1/0008* (2013.01); *B60C 5/14* (2013.01); *C08L 15/02* (2013.01); *C08L 2205/03* (2013.01)

(58) Field of Classification Search
CPC ...... C08L 15/02; C08L 101/00; C08L 23/283; C08L 7/00; C08L 57/02; C08L 2205/03; B60C 1/0008; B60C 5/14; B60C 2005/145; C08K 3/04; C08K 3/22; C08K 3/06; C08K 5/47
See application file for complete search history.

(56) References Cited

U.S. PATENT DOCUMENTS

| | | | | |
|---|---|---|---|---|
| 5,207,847 A | * | 5/1993 | Tokieda | ................ B60C 1/0025 152/209.5 |
| 2008/0314491 A1 | * | 12/2008 | Soeda | ...................... B32B 7/12 156/123 |
| 2009/0197995 A1 | * | 8/2009 | Tracey | .................... C08L 23/22 524/52 |
| 2013/0087263 A1 | * | 4/2013 | Keung | .................... B32B 27/08 152/510 |
| 2014/0110031 A1 | | 4/2014 | Miyazaki | |
| 2014/0116594 A1 | | 5/2014 | Miyazaki | |
| 2015/0101726 A1 | * | 4/2015 | Ulmer | ..................... C08L 21/00 264/331.17 |

FOREIGN PATENT DOCUMENTS

| | | |
|---|---|---|
| JP | 2014-084380 | 5/2014 |
| JP | 2014-084430 | 5/2014 |
| JP | 2015-501359 | 1/2015 |
| JP | 2015-101712 | 6/2015 |
| JP | 5745490 | 7/2015 |
| JP | 2016-003296 | 1/2016 |
| WO | WO 2013/060858 | 5/2013 |
| WO | WO 2015/008565 | 1/2015 |
| WO | WO 2017/018386 | 2/2017 |

OTHER PUBLICATIONS

International Search Report for International Application No. PCT/JP2017/023479 dated Sep. 5, 2017, 4 pages, Japan.

* cited by examiner

*Primary Examiner* — Angela C Scott
(74) *Attorney, Agent, or Firm* — THORPE NORTH & WESTERN

(57) ABSTRACT

A pneumatic tire includes an innerliner and a tie rubber. A rubber composition for an innerliner constituting the innerliner includes from 25 to 75 parts by mass of a carbon black having a nitrogen adsorption specific surface area from 25 to 95 $m^2/g$, from 1 to 13 parts by mass of a resin, and from 0.1 to 1.8 parts by mass of zinc oxide, per 100 parts by mass of a diene rubber containing from 50 to 100 parts by mass of halogenated butyl rubber, and the dynamic storage modulus at −45° C. of the rubber composition is not greater than 600 Mpa.

9 Claims, 1 Drawing Sheet

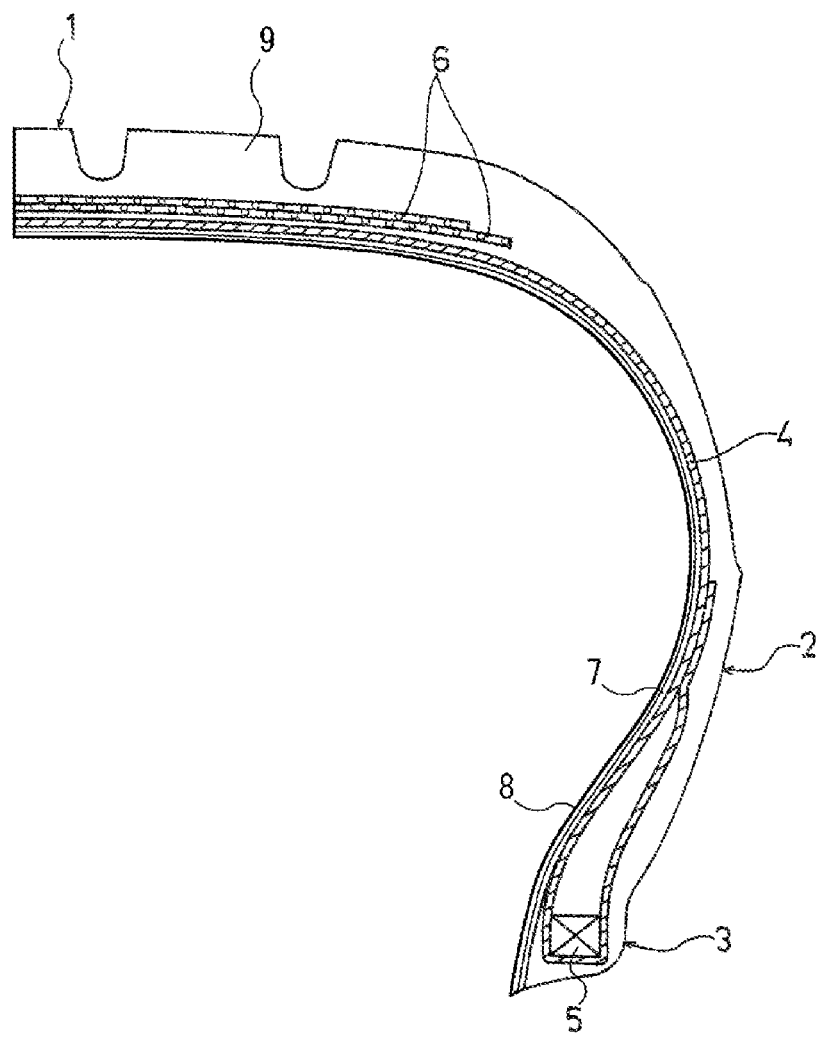

… (1)

PNEUMATIC TIRE

TECHNICAL FIELD

The present technology relates to a pneumatic tire having enhanced steering stability and enhanced crack growth resistance in a low-temperature environment.

BACKGROUND ART

For an innerliner of a pneumatic tire, excellent air permeability resistance, and a low heat build-up, a high degree of hardness, and crack growth resistance are required. The low heat build-up, the high degree of hardness, and the crack growth resistance are significant properties that affect low fuel economy performance, steering stability, and the durability of the pneumatic tire.

In order to enhance the degree of hardness of a rubber composition for an innerliner, an increase in compounded amounts of zinc oxide and petroleum-based resin in a halogenated butyl rubber has been conventionally known. However, as zinc oxide is hardly dispersed and the amount of petroleum-based resin is increased, this increases the glass transition temperature Tg of the rubber composition. Thus, the cracking resistance in a low-temperature environment may be deteriorated. Therefore, it was difficult to ensure that the rubber composition has cracking resistance performance in a low-temperature environment as well as has steering stability by increasing rubber hardness.

Japan Unexamined Patent Publication No. 5745490 discloses an innerliner rubber composition in which at least one semi-reinforcing filler selected from the group consisting of finely ground bituminous coal, talc, mica, and hard clay; a carbon black having a nitrogen adsorption specific surface area from 20 to 35 m$^2$/g; and zinc oxide and a mixed resin are mixed in a reclaimed butyl rubber and a halogenated butyl rubber to improve the steering stability, fuel consumption, and air barrier properties. However, it was difficult to ensure that a pneumatic tire including this rubber composition achieves both steering stability and crack growth resistance in a low-temperature environment.

SUMMARY

The present technology provides a pneumatic tire in which the steering stability and the crack growth resistance in a low-temperature environment are enhanced to or beyond conventional levels.

A pneumatic tire of the present technology includes an innerliner and a tie rubber. A rubber composition for an innerliner constituting the innerliner includes from 25 to 75 parts by mass of a carbon black having a nitrogen adsorption specific surface area from 25 to 95 m$^2$/g; from 1 to 13 parts by mass of a resin; and from 0.1 to 1.8 parts by mass of zinc oxide, per 100 parts by mass of a diene rubber containing 50 to 100 parts by mass of halogenated butyl rubber. The dynamic storage elastic modulus at −45° C. of the rubber composition is not greater than 600 Mpa.

In the pneumatic tire of the present technology, the dynamic storage modulus at −45° C. of the rubber composition for an innerliner is not greater than 600 Mpa, including from 25 to 75 parts by mass of a specific carbon black; from 1 to 13 parts by mass of resin; and from 0.1 to 1.8 parts by mass of zinc oxide, per 100 parts by mass of a diene rubber containing 50 to 100 parts by mass of halogenated butyl rubber. Therefore, the steering stability and the crack growth resistance in a low-temperature environment can be enhanced to or beyond conventional levels.

In the rubber composition for an innerliner, the number of cycles to fracture in a constant strain fatigue test at a strain ratio of 120% and a frequency of 6.67 Hz may be not less than 800000.

When the ratio $HS_T/HS_{IL}$ of the rubber hardness $HS_T$ of a rubber composition for a tie rubber constituting the tie rubber to the rubber hardness $HS_{IL}$ of the rubber composition for an innerliner is not less than 1.1, a balance between the steering stability and the cracking resistance performance can be made more excellent.

BRIEF DESCRIPTION OF DRAWINGS

FIG. 1 is a meridian cross-sectional view illustrating one example of an embodiment of a pneumatic tire of the present technology.

DETAILED DESCRIPTION

In FIG. 1, a pneumatic tire includes a tread portion 1, a side portion 2, and a bead portion 3. A carcass layer 4 is mounted between left and right bead portions 3 and 3, and each end of the carcass layer 4 is folded from the inside to the outside of the tire around a bead core 5. A belt layer 6 is disposed on the outer side in a tire radial direction of the carcass layer 4 in the tread portion 1, and a tread rubber 9 is disposed on the outside of the belt layer 6. A tie rubber 7 is disposed on the inner side in the tire radial direction of the carcass layer 4, and an innerliner 8 is disposed on the inner side of the tie rubber 7. The innerliner 8 is a layer formed from a rubber composition for an innerliner. The tie rubber 7 is a layer formed from a rubber composition for a tie rubber.

A rubber component of the rubber composition for an innerliner is a diene rubber. The diene rubber contains a halogenated butyl rubber. The content of the halogenated butyl rubber in 100 mass % of the diene rubber is from 50 to 100 mass %, and preferably from 60 to 80 mass %. When the content of the halogenated butyl rubber is not less than 50 mass %, the air permeation preventive performance can be secured. Examples of the halogenated butyl rubber include a brominated butyl rubber and a chlorinated butyl rubber.

The diene rubber may contain a diene rubber other than the halogenated butyl rubber. Examples of the other diene rubber include a butyl rubber, a natural rubber, an isoprene rubber, a butadiene rubber, a styrene-butadiene rubber, and an acrylonitrile-butadiene rubber. The diene rubber may be used alone or as a mixture of two or more thereof.

Blending a carbon black in the rubber composition for an innerliner contains enhances the rubber hardness and the crack growth resistance. The compounded amount of the carbon black is from 25 to 75 parts by mass, and preferably from 30 to 70 parts by mass, per 100 parts by mass of the diene rubber. When the compounded amount of the carbon black is less than 25 parts by mass, the rubber composition does not have sufficient rubber hardness, and the steering stability is deteriorated. When the compounded amount of the carbon black is greater than 75 parts by mass, the dynamic storage modulus at −45° C. is increased to decrease the crack growth resistance.

The carbon black used in an embodiment of the present technology has a nitrogen adsorption specific surface area N$_2$SA from 25 to 95 m$^2$/g, and preferably from 30 to 55 m$^2$/g. When N$_2$SA is less than 25 m$^2$/g, mechanical properties such as the rubber hardness and the dynamic elastic modulus of the rubber composition for an innerliner may be deteriorated to make the crack growth resistance insufficient. When $N_2SA$ is greater than 95 $m^2/g$, the rolling resistance is increased. Further, the crack growth resistance is deteriorated. Such a carbon black can be appropriately selected and used from HAF (High Abrasion Furnace) to GPF (General Purpose Furnace) grade carbon blacks. The $N_2SA$ of the carbon black is measured in accordance with JIS (Japanese Industrial Standard) K6217-2.

In an embodiment of the present technology, the rubber composition for an innerliner contains a resin. Examples of the resin include a petroleum-based resin and/or an aromatic resin. Blending the resin in the rubber composition for an innerliner can enhance the rubber hardness and the separation and adhesion force between rubbers of the rubber composition for an innerliner. The compounded amount of the resin is from 1 to 13 parts by mass, and preferably from 3 to 10 parts by mass, per 100 parts by mass of the diene rubber. When the compounded amount of the resin is less than 1 part by mass, the rubber hardness cannot be sufficiently enhanced. When the compounded amount of the resin is greater than 13 parts by mass, the dynamic storage modulus at −45° C. is increased to decrease the crack growth resistance. Further, the air permeation preventive performance may be deteriorated.

The petroleum-based resin is an aromatic hydrocarbon resin or a saturated or unsaturated aliphatic hydrocarbon resin that is produced by polymerizing a component obtained by subjecting crude oil to a treatment such as distillation, decomposition, and modification. Examples of the petroleum-based resin include a C5 petroleum resins (aliphatic petroleum resin obtained by polymerizing a fraction such as isoprene, 1,3-pentadiene, cyclopentadiene, methylbutene, and pentene), a C9 petroleum resin (aromatic petroleum resin obtained by polymerizing a fraction such as α-methylstyrene, o-vinyl toluene, m-vinyl toluene, and p-vinyl toluene), and a C5C9 copolymerization petroleum resin.

The aromatic resin is a polymer having at least one segment including an aromatic hydrocarbon. Examples thereof include a coumarone resin, a phenol resin, an alkylphenol resin, a terpene resin, a rosin resin, a novolac resin, and a resol resin. These resins may be used alone or as a mixture of two or more thereof. The aforementioned C9 petroleum resin is an aromatic hydrocarbon resin, but in the specification, is classified as the petroleum-based resin.

In an embodiment of the present technology, the rubber composition for an innerliner contains zinc oxide in an amount from 0.1 to 1.8 parts by mass, and preferably from 0.2 to 1.6 parts by mass, per 100 parts by mass of the diene rubber. Due to the presence of zinc oxide, the rubber hardness can be secured to make the steering stability excellent. When the compounded amount of zinc oxide is less than 0.1 parts by mass, the rubber hardness is insufficient. When the compounded amount of zinc oxide is greater than 1.8 parts by mass, the dynamic storage modulus at −45° C. is increased to decrease the crack growth resistance. Further, the steering stability is also deteriorated.

The dynamic storage modulus at −45° C. of the rubber composition for an innerliner is not greater than 600 MPa, and preferably from 410 to 590 MPa. When the dynamic storage modulus at −45° C. is not greater than 600 MPa, the crack growth resistance of the pneumatic tire in a low-temperature environment can be improved to be made excellent. In the specification, the dynamic storage modulus at −45° C. is measured under conditions including an initial strain of 10%, a dynamic strain of ±2%, a frequency of 20 Hz, and a temperature of −45° C.

The number of cycles to fracture in a constant strain fatigue test of the rubber composition for an innerliner is preferably not less than 800000, and more preferably from 810000 to 990000. When the number of cycles to fracture in the constant strain fatigue test is not less than 800000, the tire durability can be made excellent. In the specification, the constant strain fatigue test is performed with reference to tensile fatigue properties described in JIS-K6270 using a dumbbell-shaped JIS No. 3 test piece (thickness: 2 mm) under conditions including a strain ratio of 120%, a frequency of 6.67 Hz, 20° C., and a test frequency of 6.67 Hz (rotational speed: 400 rpm).

In the pneumatic tire according to an embodiment of the present technology, the tie rubber is a layer formed from the rubber composition for a tie rubber. A rubber component of the rubber composition for a tie rubber is a diene rubber. Examples thereof include a natural rubber, an isoprene rubber, a butadiene rubber, a styrene-butadiene rubber, and an acrylonitrile-butadiene rubber. The diene rubber constituting the tie rubber includes a diene rubber of a rubber composition constituting an adjacent carcass layer as a main component. Therefore, the affinity of the tie rubber with the carcass layer can be increased.

Blending a carbon black in the aforementioned diene rubber can enhance the rubber hardness of the rubber composition for a tie rubber. A carbon black may be contained in an amount of preferably from 40 to 70 parts by mass, and more preferably from 50 to 60 parts by mass, per 100 parts by mass of the diene rubber. When the compounded amount of carbon black falls within such a range, the rubber hardness can be secured.

The nitrogen adsorption specific surface area of the carbon black to be compounded in the rubber composition for a tie rubber is not particularly limited, and is preferably from 20 to 60 $m^2/g$, and more preferably from 30 to 50 $m^2/g$. When the nitrogen adsorption specific surface area of the carbon black constituting the tie rubber falls within such a range, the rubber hardness is easily adjusted.

In the pneumatic tire according to an embodiment of the present technology, the ratio $HS_T/HS_{IL}$ of the rubber hardness $HS_T$ of the rubber composition for a tie rubber to the rubber hardness $HS_{IL}$ of the rubber composition for an innerliner is not particularly limited, and the ratio is preferably not less than 1.1, and more preferably from 1.12 to 1.25. When the ratio $HS_T/HS_{IL}$ of the rubber hardness is not less than 1.1, the steering stability of a tire to be formed can be made more excellent. In particular, when the compounded amounts of carbon black and zinc oxide in the rubber composition for an innerliner are smaller than those of a conventional rubber composition for an innerliner, the rubber hardness $HS_{IL}$ of the rubber composition for an innerliner may be decreased. However, the rubber hardness $HS_T$ is increased so that the ratio $HS_T/HS_{IL}$ of the rubber hardness is not less than 1.1, and thereby the steering stability of a pneumatic tire to be formed can be maintained to a favorable level.

In an embodiment of the present technology, the rubber composition for an innerliner and the rubber composition for a tie rubber may contain various types of additives generally used for a tire rubber composition, such as a vulcanization or crosslinking agent, an anti-aging agent, a plasticizer, a processing aid, a liquid polymer, a terpene resin, and a thermosetting resin, without impairing the present technology. Such an additive can be kneaded by a general method to form a rubber composition, and the rubber composition may be used for vulcanization or crosslinking. The compounded amount of these additives may be any conventional quantity, as long as the present technology is not impaired. The pneumatic tire according to an embodiment of the present technology can be produced by mixing each of the components described above by using a commonly used rubber kneading machine, such as a Banbury mixer, a kneader, and a roller.

The pneumatic tire according to an embodiment of the present technology can have an excellent balance between the air permeation preventive performance, and the steering stability and the crack growth resistance in a low-temperature environment.

The present technology is further described below by the examples. However, the scope of the present technology is not limited to these examples.

EXAMPLES

Rubber Composition for Innerliner

Components for each of 14 rubber compositions for an innerliner (Examples 1 to 7, the standard example, and Comparative Examples 1 to 6) in compositions shown in Tables 1 and 2 as a rubber composition for an innerline, except for sulfur and a vulcanization accelerator, were kneaded for 5 minutes by a 1.8-L sealed mixer and were taken as a master batch. To each of the obtained master batches, the sulfur and the vulcanization accelerator were added, and the mixture was mixed in an open roll to prepare each of the 14 rubber compositions for an innerliner.

The 14 types of rubber compositions for an innerliner were each vulcanized in a mold with a predetermined shape at 180° C. for 10 minutes to prepare a rubber test sample. The dynamic storage modulus (E') at −45° C., constant strain fatigue test, crack growth resistance, and rubber hardness ($HS_{IL}$) of the rubber test samples were evaluated by methods described below.

Rubber Composition for Tie Rubber

Components for a rubber composition for a tie rubber in a composition shown in Table 3, except for sulfur and a vulcanization accelerator, were kneaded for 5 minutes by a 1.8-L sealed mixer and were taken as a master batch. The sulfur and the vulcanization accelerator were added to the obtained master batch, and the mixture was mixed in an open roll to prepare the rubber compositions for a tie rubber. The obtained rubber composition for a tie rubber was vulcanized in a mold with a predetermined shape at 180° C. for 10 minutes to prepare a rubber test piece. The rubber hardness ($HS_T$) of the rubber test piece was evaluated by a method described below.

Dynamic Storage Modulus at −45° C. (E')

By a viscoelastic spectrometer available from Toyo Seiki Seisaku-sho, Ltd., the dynamic storage modulus (E') at −45° C. of the obtained rubber test pieces was measured in accordance with JIS K6394 under conditions including an initial strain of 10%, a dynamic strain of ±2%, and a frequency of 20 Hz. The results of E' are shown in "E' (at −45° C.)" rows of Tables 1 and 2.

Constant Strain Fatigue Test

From each of the obtained rubber test samples, a dumbbell-shaped JIS No. 3 test piece was produced in accordance with JIS K6251, and subjected to a tensile constant strain fatigue test with reference to JIS-K6270 under conditions including 20° C., a strain ratio of 120%, and a test frequency of 6.67 Hz (rotational speed: 400 rpm). The number of cycles to fracture was measured. The results are shown in "constant strain fatigue-number of cycles to fracture" rows of Tables 1 and 2.

Crack Growth Resistance

Each of the obtained rubber test samples was cut out in accordance with JIS K6251, to obtain a dumbbell-shaped JIS No. 3 test piece. The length of crack growth caused by repeated bending was measured by a De Mattia flex cracking tester in accordance with JIS K6260 under conditions including a temperature of −45° C., a stroke of 57 mm, a speed of 300±10 rpm, and the number of bending of 100000. The presence or absence of a crack on a surface of the test piece was visually observed, and then evaluated in accordance with the following criteria A to C. The state of the crack was evaluated into six grades in accordance with the following criteria 1 to 6. The obtained results are shown in the "cracking resistance performance" rows of Tables 1 and 2.

A: There were some cracks (less than about 10 cracks).

B: There were many cracks (not less than about 10 cracks and less than 100 cracks).

C: There were very many cracks (not less than about 100 cracks).

0: Cracks were not observed by the naked eye and a magnifying lens with a magnification of 10.

1: Cracks were not observed by the naked eye, but were confirmed by a magnifying lens with a magnification of 10.

2: Cracks were observed by the naked eye.

3: Cracks were observed by the naked eye, and the cracks were deep and relatively large (length: less than 1 mm).

4: Deep and large cracks were confirmed (length: from 1 to less than 3 mm)

5: Cracks having a length of not less than 3 mm were confirmed or the test piece was cut.

Rubber Hardness

The degrees of rubber hardness of the obtained rubber test pieces of the rubber compositions for an innerliner ($HS_{IL}$) and the rubber composition for a tie rubber ($HS_T$) were measured by a type A durometer at 20° C. in accordance with JIS K6253. The ratio $HS_T/HS_{IL}$ of the rubber hardness was calculated. The results are shown in "rubber hardness ratio $HS_T/HS_{IL}$" rows of Tables 1 and 2. A larger rubber hardness indicates more excellent steering stability.

Production of Pneumatic Tire

A pneumatic tire with a tire size of 205/60R16 including an innerliner formed from each of the obtained rubber compositions for an innerliner and a tie rubber formed from the rubber composition for a tie rubber was produced. The steering stability of the obtained pneumatic tires was evaluated by a method described below.

Steering Stability

The obtained pneumatic tires were each assembled on a rim (16×6 J) and mounted on a 2.5 L class test vehicle made in Japan. The pneumatic tires were each driven in a test course at 80 km/h under a condition of an air pressure of 200 kPa. Sensory evaluations (rating of 1 to 10) were performed by three experienced panelists. The results are shown in "steering stability" rows of Tables 1 and 2. A larger value indicates more excellent steering stability.

TABLE 1

|  |  | Standard Example | Example 1 | Example 2 | Example 3 |
| --- | --- | --- | --- | --- | --- |
| Halogenated butyl rubber | Part by mass | 80 | 80 | 80 | 80 |
| Natural rubber | Part by mass | 20 | 20 | 20 | 20 |
| Carbon black 1 | Part by mass | 60 | 60 | 60 | 60 |
| Carbon black 2 | Part by mass |  |  |  |  |
| Talc | Part by mass |  |  |  |  |
| Zinc oxide | Part by mass | 3.5 | 0.5 | 1.0 | 1.5 |
| Resin | Part by mass | 15 | 5 | 5 | 5 |
| Sulfur | Part by mass | 1 | 1 | 1 | 1 |
| Vulcanization accelerator 1 | Part by mass | 0.5 | 0.5 | 0.5 | 0.5 |
| Vulcanization accelerator 2 | Part by mass | 0.5 | 0.5 | 0.5 | 0.5 |
| E' (−45° C.) | MPa | 650 | 450 | 470 | 500 |
| Constant strain fatigue - number of cycles to fracture | Number | 720,000 | 900,000 | 850,000 | 830,000 |
| Rubber hardness $HS_T/HS_{IL}$ | ° C. | 1.05 | 1.14 | 1.17 | 1.20 |
| Steering stability | Index value | 5 | 6 | 7 | 9 |
| Cracking resistance performance | Index value | B3 | A2 | A3 | A3 |

|  |  | Example 4 | Example 5 | Example 6 | Example 7 |
| --- | --- | --- | --- | --- | --- |
| Halogenated butyl rubber | Part by mass | 80 | 80 | 80 | 80 |
| Natural rubber | Part by mass | 20 | 20 | 20 | 20 |
| Carbon black 1 | Part by mass | 60 | 60 |  | 40 |
| Carbon black 2 | Part by mass |  |  | 60 |  |
| Talc | Part by mass |  |  |  |  |
| Zinc oxide | Part by mass | 0.5 | 1.5 | 0.5 | 0.5 |
| Resin | Part by mass | 8 | 8 | 5 | 3 |
| Sulfur | Part by mass | 1 | 1 | 1 | 1 |
| Vulcanization accelerator 1 | Part by mass | 0.5 | 0.5 | 0.5 | 0.5 |
| Vulcanization accelerator 2 | Part by mass | 0.5 | 0.5 | 0.5 | 0.5 |
| E' (−45° C.) | MPa | 530 | 580 | 580 | 500 |
| Constant strain fatigue - number of cycles to fracture | Number | 880,000 | 870,000 | 860,000 | 870,000 |
| Rubber hardness $HS_T/HS_{IL}$ | ° C. | 1.15 | 1.20 | 1.07 | 1.08 |
| Steering stability | Index value | 8 | 9 | 8 | 7 |
| Cracking resistance performance | Index value | A3 | A3 | A2 | A2 |

TABLE 2

|  |  | Comparative Example 1 | Comparative Example 2 | Comparative Example 3 |
| --- | --- | --- | --- | --- |
| Halogenated butyl rubber | Part by mass | 80 | 80 | 80 |
| Natural rubber | Part by mass | 20 | 20 | 20 |
| Carbon black 1 | Part by mass | 60 | 60 | 20 |
| Talc | Part by mass |  |  |  |
| Zinc oxide | Part by mass | 2.0 | 1.0 | 1.0 |
| Resin | Part by mass | 5 | 15 | 5 |
| Sulfur | Part by mass | 1 | 1 | 1 |
| Vulcanization accelerator 1 | Part by mass | 0.5 | 0.5 | 0.5 |
| Vulcanization accelerator 2 | Part by mass | 0.5 | 0.5 | 0.5 |
| E' (−45° C.) | MPa | 620 | 630 | 400 |
| Constant strain fatigue - number of cycles to fracture | Number | 730,000 | 740,000 | 1,000,000 |
| Rubber hardness $HS_T/HS_{IL}$ | ° C. | 1.05 | 1.05 | 1.09 |
| Steering stability | Index value | 4 | 4 | 2 |
| Cracking resistance performance | Index value | B4 | B4 | A2 |

|  |  | Comparative Example 4 | Comparative Example 5 | Comparative Example 6 |
| --- | --- | --- | --- | --- |
| Halogenated butyl rubber | Part by mass | 80 | 45 | 80 |
| Natural rubber | Part by mass | 20 | 55 | 55 |
| Carbon black 1 | Part by mass | 80 | 60 | 45 |
| Talc | Part by mass |  |  | 20 |
| Zinc oxide | Part by mass | 1.0 | 0.5 | 0.5 |
| Resin | Part by mass | 5 | 5 | 5 |
| Sulfur | Part by mass | 1 | 1 | 1 |
| Vulcanization accelerator 1 | Part by mass | 0.5 | 0.5 | 0.5 |
| Vulcanization accelerator 2 | Part by mass | 0.5 | 0.5 | 0.5 |

TABLE 2-continued

| | | | | |
|---|---|---|---|---|
| E' (−45° C.) | MPa | 700 | 500 | 650 |
| Constant strain fatigue - number of cycles to fracture | Number | 600,000 | 900,000 | 700,000 |
| Rubber hardness $HS_T/HS_{IL}$ | ° C. | 1.00 | 1.05 | 0.9 |
| Steering stability | Index value | 8 | 3 | 8 |
| Cracking resistance performance | Index value | C3 | A2 | C4 |

The types of raw materials used in Tables 1 and 2 are shown below.

Halogenated butyl rubber: brominated isobutylene-isoprene rubber, available from EXXON CHEMICAL Natural rubber: TSR20

Carbon black 1: Niteron #55S available from NSCC Carbon Co., Ltd., N2SA: 36 m²/g Carbon black 2: Show Black N234 available from Cabot Japan K.K., N2SA: 120 m²/g Talc: Catalpo Y-K available from SANYOU CLAY INDUSTRIAL CO., LTD.

Zinc oxide: Zinc Oxide III available from Seido Chemical Industry Co., Ltd.

Resin: aromatic petroleum resin available from AIR WATER INC.

Sulfur: SULFAX 5 available from Tsurumi Chemical Industry Co., Ltd.

Vulcanization accelerator 1: DM-PO available from Ouchi Shinko Chemical Industrial Co., Ltd.

Vulcanization accelerator 2: NOCCELER NS-P available from Ouchi Shinko Chemical Industrial Co., Ltd.

TABLE 3

| Composition of tie rubber composition | | |
|---|---|---|
| Natural rubber | 80 | Part by mass |
| SBR | 20 | Part by mass |
| Carbon black 1 | 60 | Part by mass |
| Zinc oxide | 3.0 | Part by mass |
| Sulfur | 2 | Part by mass |
| Vulcanization accelerator 2 | 1 | Part by mass |

The types of raw materials used as per Table 3 are described below.

Natural rubber: TSR20

SBR: emulsion-polymerized styrene-butadiene rubber; Nipol 1502 available from ZEON CORPORATION Carbon black 1: Niteron #55S available from NSCC Carbon Co., Ltd., $N_2SA$: 36 m²/g Zinc oxide: Zinc Oxide III available from Seido Chemical Industry Co., Ltd.

Sulfur: SULFAX 5 available from Tsurumi Chemical Industry Co., Ltd.

Vulcanization accelerator 2: NOCCELER NS-P available from Ouchi Shinko Chemical Industrial Co., Ltd.

As confirmed from Table 1, the pneumatic tires in Examples 1 to 7 have steering stability enhanced to or beyond conventional levels, and excellent crack growth resistance in a low-temperature environment.

In the pneumatic tire in Comparative Example 1, the compounded amount of zinc oxide in the rubber composition for an innerliner is greater than 1.8 parts by mass, and the dynamic storage modulus at −45° C. is greater than 600 MPa. Therefore, the steering stability is deteriorated, and the cracking resistance performance at low temperatures is also deteriorated.

In the pneumatic tire in Comparative Example 2, the compounded amount of resin in the rubber composition for an innerliner is greater than 13 parts by mass, and the dynamic storage modulus at −45° C. is greater than 600 MPa. Therefore, the steering stability is deteriorated, and the cracking resistance performance at low temperatures is also deteriorated.

In the pneumatic tire in Comparative Example 3, the compounded amount of carbon black in the rubber composition for an innerliner is less than 25 parts by mass. Therefore, the steering stability is deteriorated.

In the pneumatic tire in Comparative Example 4, the compounded amount of carbon black in the rubber composition for an innerliner is greater than 75 parts by mass, and the dynamic storage modulus at −45° C. is greater than 600 MPa. Therefore, the cracking resistance performance at low temperatures is deteriorated.

In the pneumatic tire in Comparative Example 5, the content of halogenated butyl rubber in the rubber composition for an innerliner is less than 50 mass %. Therefore, the rubber hardness is decreased to deteriorate the steering stability. Further, the air permeability resistance is insufficient.

In the pneumatic tire in Comparative Example 6, talc was compounded in the rubber composition for an innerliner. Therefore, the dynamic storage modulus at −45° C. is greater than 600 MPa, and the cracking resistance performance at low temperatures is deteriorated.

The invention claimed is:

1. A pneumatic tire comprising:
   an innerliner; and
   a tie rubber comprising a tie rubber composition, the tie rubber composition including a first diene rubber selected only from a natural rubber, an isoprene rubber, a a styrene-butadiene rubber, or mixtures of two or more rubbers selected from the natural rubber, the isoprene rubber and the styrene-butadiene rubber,
   an innerliner rubber composition constituting the innerliner including
   from 25 to 75 parts by mass of a carbon black having a nitrogen adsorption specific surface area from 25 to 95 m²/g,
   a total resin content of the innerliner rubber composition of from 1 to 10 parts by mass, and
   from 0.1 to 1.8 parts by mass of zinc oxide,
   per 100 parts by mass of a second diene rubber containing from 50 to 100 parts by mass of halogenated butyl rubber, and
   a dynamic storage modulus at −45° C. of the innerliner rubber composition is not greater than 600 Mpa.

2. The pneumatic tire according to claim 1,
   wherein the number of cycles to fracture in a constant strain fatigue test of the innerliner rubber composition at a strain ratio of 120% and a frequency of 6.67 Hz is not less than 800,000.

3. The pneumatic tire according to claim 2, wherein a ratio $HS_T/HS_{IL}$ of a rubber hardness $HS_T$ of the tie rubber composition to a rubber hardness $HS_{IL}$ of the innerliner rubber composition is not less than 1.1.

4. The pneumatic tire according to claim 1, wherein a ratio $HS_T/HS_{IL}$ of a rubber hardness $HS_T$ of the tie rubber composition to a rubber hardness $HS_{IL}$ of the innerliner rubber composition is not less than 1.1.

5. The pneumatic tire according to claim 1, wherein the innerliner rubber composition includes a total zinc oxide content of from 0.1 to 0.8 parts by mass.

6. The pneumatic tire according to claim 1, wherein a ratio $HS_T/HS_{IL}$ of a rubber hardness $HS_T$ of the tie rubber composition to a rubber hardness $HS_{IL}$ of the innerliner rubber composition is from not less than 1.1 to not more than 1.13.

7. The pneumatic tire according to claim 1, wherein the tie rubber composition comprises the isoprene rubber or the butadiene rubber.

8. The pneumatic tire according to claim 1, wherein the tie rubber composition comprises the butadiene rubber.

9. The pneumatic tire according to claim 1, wherein the innerliner rubber composition includes a total zinc oxide content of from 0.1 to 0.7 parts by mass.

\* \* \* \* \*